United States Patent
Hon et al.

(10) Patent No.: US 6,571,210 B2
(45) Date of Patent: *May 27, 2003

(54) CONFIDENCE MEASURE SYSTEM USING A NEAR-MISS PATTERN

(75) Inventors: Hsiao-Wuen Hon, Woodinville, WA (US); Asela J. R. Gunawardana, Baltimore, MD (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,001

(22) Filed: Nov. 13, 1998

(65) Prior Publication Data

US 2001/0018654 A1 Aug. 30, 2001

(51) Int. Cl.⁷ .............................. G10L 15/06
(52) U.S. Cl. ................ 704/251; 704/243; 704/256
(58) Field of Search ................ 704/240, 243, 704/256, 242, 246, 251, 231

(56) References Cited

U.S. PATENT DOCUMENTS

| | | | |
|---|---|---|---|
| RE31,188 E | * 3/1983 | Pirz et al. | 704/251 |
| 4,783,803 A | 11/1988 | Baker et al. | 704/252 |
| 4,797,929 A | * 1/1989 | Gerson et al. | 704/251 |
| 4,802,231 A | 1/1989 | Davis | 382/34 |
| 5,241,619 A | 8/1993 | Schwartz et al. | 398/2 |
| 5,509,104 A | 4/1996 | Lee et al. | 395/2.65 |
| 5,566,272 A | * 10/1996 | Brems et al. | 704/231 |
| 5,613,037 A | 3/1997 | Sukkar | 704/256 |
| 5,625,748 A | * 4/1997 | McDonough et al. | 704/251 |
| 5,649,057 A | 7/1997 | Lee et al. | 395/2.65 |
| 5,675,706 A | 10/1997 | Lee et al. | 704/256 |
| 5,677,990 A | 10/1997 | Junqua | 395/2.64 |
| 5,710,864 A | * 1/1998 | Juang et al. | 704/238 |
| 5,710,866 A | * 1/1998 | Alleva et al. | 704/256 |
| 5,712,957 A | * 1/1998 | Waibel et al. | 704/240 |
| 5,749,069 A | 5/1998 | Komori et al. | 704/240 |

(List continued on next page.)

OTHER PUBLICATIONS

Chen et al. "discrimiantive training . . . using N–best candidates" IEEE, 1994, pp 625–628.*
Rohlicek et al., "Continuous Hidden Markov Modeling for Speaker–Independent Word Spotting", IEEE International Conference on Acoustics, Speech, and Signal Processing, vol. 1, pp. 627–630, 1989.
Rose et al., A Hidden Markov Model Based Keyword Recognition System[1], IEEE International Conference on Acoustics, Speech, and Signal Processing, vol. 1, pp. 129–132, 1990.

(List continued on next page.)

*Primary Examiner*—Talivaldis Ivars Šmits
*Assistant Examiner*—Daniel Abebe
(74) *Attorney, Agent, or Firm*—Westman, Champlin & Kelly, P.A.; S. Koehler

(57) ABSTRACT

A method and system of performing confidence measure in a speech recognition system includes receiving an utterance of input speech and creating a near-miss pattern or a near-miss list of possible word entries for the utterance. Each word entry includes an associated value of probability that the utterance corresponds to the word entry. The near-miss list of possible word entries is compared with corresponding stored near-miss confidence templates. Each word in the vocabulary (or keyword list) of near-miss confidence template, which includes a list of word entries and each word entry in each list includes an associated value. Confidence measure for a particular hypothesis word is performed based on the comparison of the values in the near-miss list of possible word entries with the values of the corresponding near-miss confidence template.

30 Claims, 12 Drawing Sheets

U.S. PATENT DOCUMENTS

| | | | | |
|---|---|---|---|---|
| 5,795,123 A | * | 8/1998 | Lovgren | 414/343 |
| 5,797,123 A | | 8/1998 | Chou et al. | 704/256 |
| 5,805,772 A | * | 9/1998 | Chou et al. | 704/255 |
| 5,842,163 A | * | 11/1998 | Weintraub | 704/240 |
| 5,937,384 A | | 8/1999 | Huang et al. | 704/256 |
| 5,983,177 A | * | 11/1999 | Wu et al. | 704/244 |
| 6,029,124 A | * | 2/2000 | Gillick et al. | 704/200 |

OTHER PUBLICATIONS

Alleva et al., "Confidence Measure and Their Application to Automatic Speech Recognition", IEEE Automatic Speech Recognition Workshop, (Snowbird, Utah), pp. 173–174, 1995.

Cox et al., Confidence Measures for the Switchboard Database, IEEE International Conference on Acoustics, Speech, and Signal Processing, vol. 1, pp. 511–514, 1996.

Jeanrenaud et al., "Large Vocabulary Word Scoring as a Basis for Transcription Generation", Proceedings of Eurospeech, vol. 3, pp. 2149–2152, 1995.

Weintraub, "LVCSR Log–Likelihood Ration Scoring for Keyword Spotting", IEEE International Conference on Acoustics, Speech, and Signal Processing, vol. 1, pp. 297–300, 1995.

Neti et al., "Word–Based Confidence Measures as a Guide for Stack Search in Speech Recognition", IEEE International Conference on Acoustics, Speech, and Signal Processing, vol. 2, pp. 883–886, 1997.

Huang et al., "Microsoft Windows Highly Intelligent Speech Recognizer: Whisper", IEEE International Conference on Acoustics, Speech, and Signal Processing, vol. 1, pp. 93–96, 1995.

Huang et al., "Whistler: A Trainable Text–To–Speech System", International Conference on Spoken Language Proceeding, vol. 4, pp. 2387–2390, 1996.

Tatsuya Kawahara et al., "Combining Key–Phrase Detection and Subword–Based Verification for Flexible Speech Understanding", Proc. IEEE ICASSP 1997, vol. 2, pp. 1159–1162, Apr. 1997.

Tatsuya Kawahara et al., "Flexible Speech Understanding Based on Combined Key–Phrase Detection and Verification", IEEE Trans. On Speech and Audio Processing vol. 6, pp. 558–568, Nov. 1998.

Asadi, A. et al., "Automatic Modeling of Adding New Words to a Large–Vocabulary Continuous Speech Recognition System," in proc. of the IEEE International Conference on Acoustics, Speech and Signal Processing, pp. 305–308 (1991).

Huang, X. et al., "Microsoft Windows Highly Intelligent Speech Recognizer: Whisper," In proc. of the IEEE International Conference on Acoustics, Speech and Signal Processing, Detroit, pp. 93–96 (May 1995).

Sukkar, R. et al. "Utterance Verification of Keyword Strings Using Word–Based Minimum Verification Error (WB–MVE) Training," in proc. of the IEEE International Conference on Acoustics, Speech and Signal Processing, Atlanta, GA, pp. 518–521 (May 1996).

Rahim, M.G. et al., "Discriminative Utterance Verification Using Minimum String Verification Error (MSVE) Training," in proc. of the IEEE International Conference on Acoustics, Speech and Signal Processing, Atlanta, GA, pp. 3585–3588 (May 1996).

Eide, E. et al. "Understanding and Improving Speech Recognition Performance Through the Use of Diagnostic Tools," in proc. of the IEEE International Conference on Acostics, Speech and Signal Processing, Detroit, pp. 221–224 (May 1995).

Chase, L., "Word and Acoustics Confidence Annotation for Large Vocabulary Speech Recognition," in proc. of the European Conference on Speech Communication and Technology, Rhodes, Greece, pp. 815–818 (Sep. 1997).

Schaaf T. et al., "Confidence Measures for Spontaneous Speech Recognition," in proc. of the IEEE International Conference on Acoustics, Speech and Signal Processing, Munich, Germany, pp. 875–878 (May 1997).

Siu, M. et al., "Improved Estimation, Evaluation and Applications of Confidence Measures for Speech Recognition," in proc. of the European Conference on Speech Communication and Technology, Rhodes, Greece, pp. 831–834 (Sep. 1997).

Weintraub, M. et al., "Neural Network Based Measures of Confidence for Word Recognition," in proc. of the IEEE International Conference on Acoustics, Speech and Signal Processing, Munich, Germany, pp. 887–890 (May 1997).

Modi P. et al., "Discriminative Utterance Verification Using Multiple Confidence Measures," in proc. of the European Conference on Speech Communication and Technology, Rhodes, Greece, pp. 103–106 (Sep. 1997).

Rivlin, A. et al., "A Phone–Dependent Confidence Measure for Utterance Rejection," in proc. of the IEEE International Conference on Acoustics, Speech and Signal Processing, Atlanta, GA, pp. 515–518 (May 1996).

Hwang, M.Y. et al., "Predicting Unseen Triphone with Senones," in proc. of the IEEE International Conference on Acoustics, Speech and Signal Processing, Minneapolis, MN, pp. 311–314 (Apr. 1993).

Alleva, F. et al., "Improvements on the Pronunciation Prefix Tree Search Organization," in proc. of the IEEE International Conference on Acoustics, Speech and Signal Processing, Atlanta, GA, pp. 133–136 (May 1996).

* cited by examiner

| WRITING | | |
|---|---|---|
| | MEAN | VARIANCE |
| WRITING | 1.00 | 0.10 |
| RIDING | 0.99 | 0.10 |
| RATING | 0.82 | 0.10 |
| RIGHT | 0.77 | 0.17 |
| WRIGHT | 0.61 | 0.30 |
| CI-PHN | 1.69 | 0.12 |
| * | 0.18 | 0.11 |

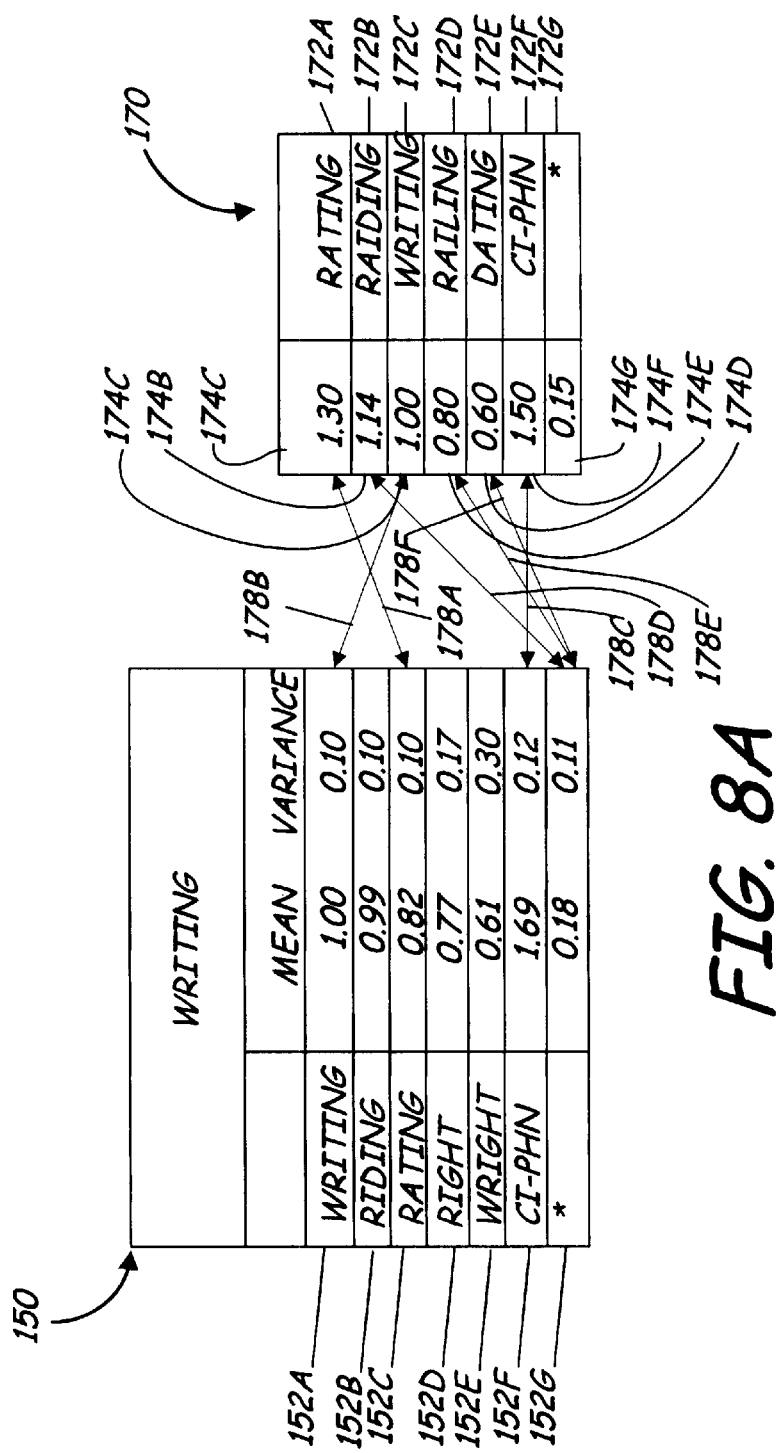

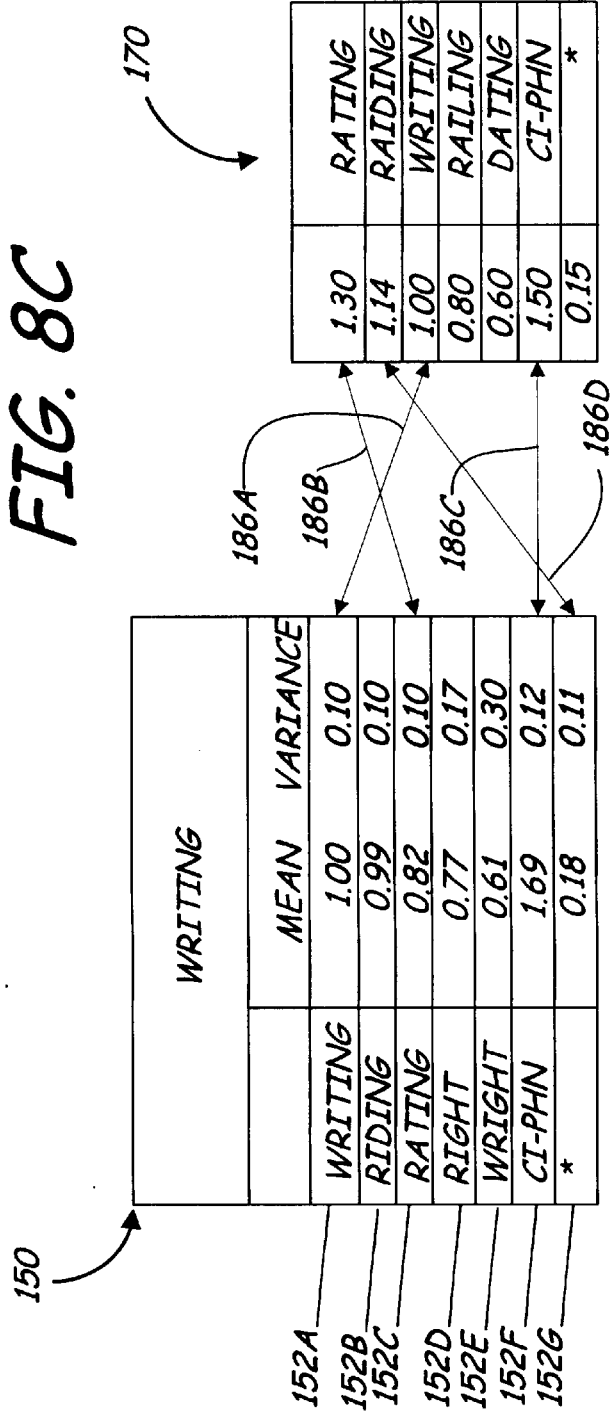
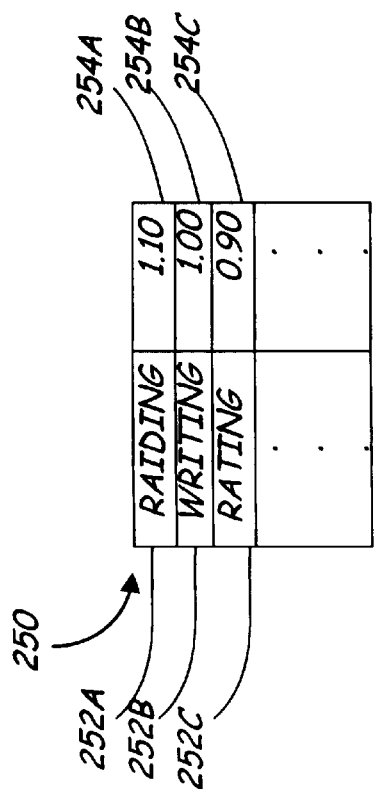

CONFIDENCE MEASURE SYSTEM USING A NEAR-MISS PATTERN

BACKGROUND OF THE INVENTION

The present invention relates to computer speech recognition. More particularly, the present invention relates to a confidence measure system using a near-miss pattern or a plurality of possible words.

Speech recognition systems are generally known. During speech recognition, speech is provided as an input into the system in the form of an audible voice signal such as through a microphone. The microphone converts the audible speech signal to an analog electronic signal. An analog-to-digital converter receives the analog signal and produces a sequence of digital signals. A conventional array processor performs spectral analysis on the digital signals and computes a magnitude value for each frequency band of a frequency spectrum. In one embodiment, the digital signal received from the analog-to-digital converter is divided into frames. The frames are encoded to reflect spectral characteristics for a plurality of frequency bands. In the case of discrete and semi-continuous hidden Markov modeling, the feature vectors are encoded into one or more code words using vector quantization techniques and a code book derived from training data. Output probability distributions are then preferably computed against hidden Markov models using the feature vector (or code words) of the particular frame being analyzed. These probability distributions are later used in executing a Viterbi or similar type of processing technique. Stored acoustic models, such as hidden Markov models, a lexicon and a language model are used to determine the most likely representative word for the utterance received by the system.

While modern speech recognition systems generally produce good search results for utterances actually present in the recognition inventory, the system has no way of discarding the search results for out-of-vocabulary (OOV) input utterances that are deemed to be wrong. In such cases, use of a confidence measure as applied to the recognition results can provide assurances as to the results obtained. Confidence measures have been used in many forms of speech recognition applications, including supervised and unsupervised adaptation, recognition error rejection, out-of-vocabulary (OOV) word detection, and keyword spotting. A method that has been used for confidence modeling is the comparison of the score of the hypothesized word with the score of a "filler" model. One such system is described by R. C. Rose and D. B. Paul, in "A Hidden Markov Model Based Key Word Recognition System," published in IEEE International Conference on Acoustics Speech, and Signal Processing, vol. 1, pp. 129–132, 1990.

It is believed by many that the confidence measure should be based on the ratio between the recognition score and the "filler model" (usually used to model OOV (out-of-vocabulary) words) score. The "filler model" models are often one of the following two types: (1) a context independent (CI) phone network where every phone is connected to every other phone; or (2) a large context dependent vocabulary system where phone connections represent almost all the possible words in a particular language. While the context independent phone network approach is very efficient, the performance is mediocre at best because of the use of imprecise CI models. The context dependent approach can generate decent confidence measures, but suffers from two shortcomings. First, the approach considers only the ratio of the scores of the best recognized word and the best "filler-model" word. Second, due to a single ratio comparison, the requirement of building all words in the OOV network is not practical and also makes the system ineffective for rejecting noise sources other than OOV words.

SUMMARY OF THE INVENTION

A method and system of performing confidence measure in speech recognition systems includes receiving an utterance of input speech and creating a near-miss pattern or a near-miss list of possible word entries for the input utterance. Each word entry includes an associated value of probability that the utterance corresponds to the word entry. The near-miss list of possible word entries is compared with corresponding stored near-miss confidence templates. Each near-miss confidence template includes a list of word entries and each word entry in each list includes an associated value. Confidence measure for a particular hypothesis word is performed based on the comparison of the values in the near-miss list of possible word entries with the values of the corresponding near-miss confidence template.

Another aspect of the present invention is a system and method for generating word-based, near-miss confidence templates for a collection of words in a speech recognition system. Each near-miss confidence template is generated from multiple near-miss lists produced by a recognizer on multiple acoustic data for the same word. Each near-miss confidence template of the set of near-miss confidence templates includes a list of word entries having an associated probability value related to acoustic similarity.

BRIEF DESCRIPTION OF THE DRAWINGS

FIGS. 8A, 8B and 8C illustrate three techniques for comparing a near-miss pattern for a word token to a near-miss confidence template.

FIG. 11 is an example of a near-miss pattern.

DETAILED DESCRIPTION OF THE PREFERRED EMBODIMENTS

Figure 1:
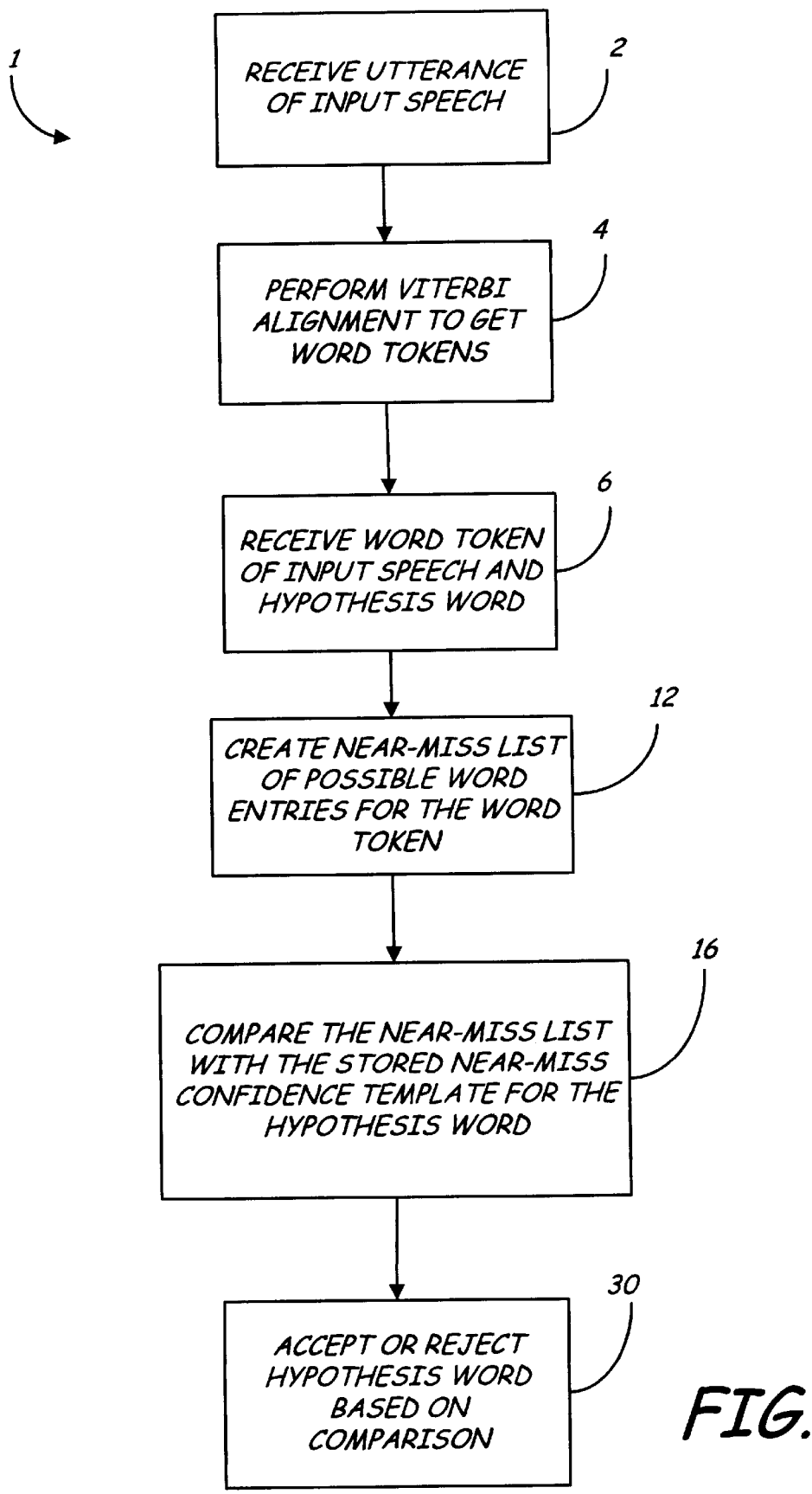
FIG. 1 is a flow chart illustrating an aspect of the present invention.
Figure 2:
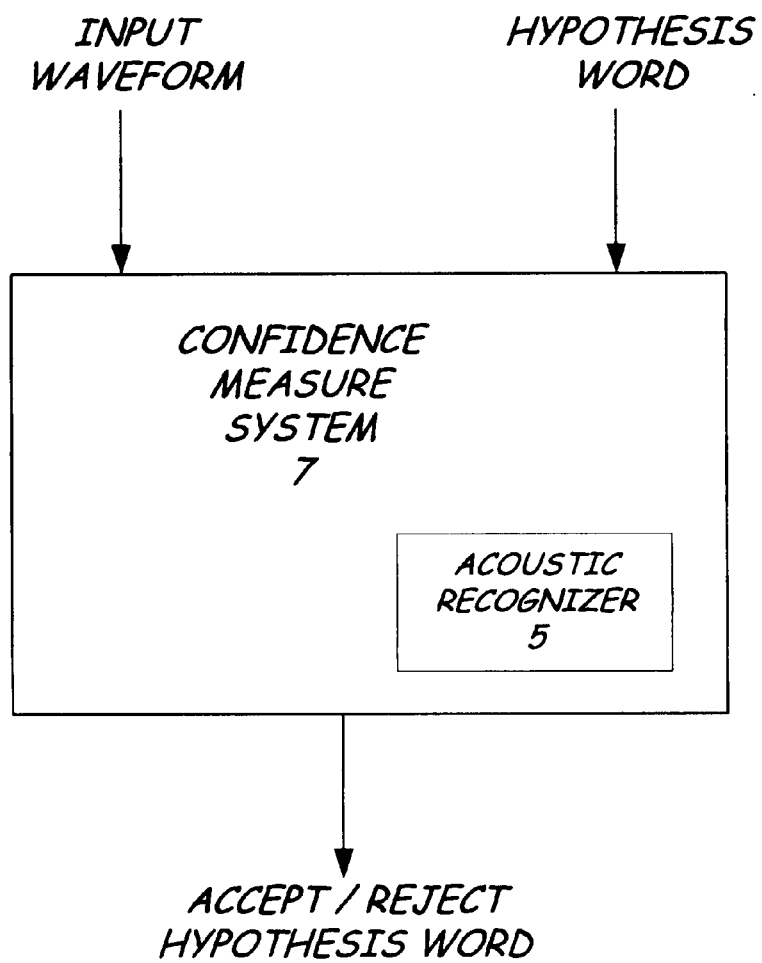
FIG. 2 is a schematic block diagram of a confidence measure system of the present invention.
Figure 3:
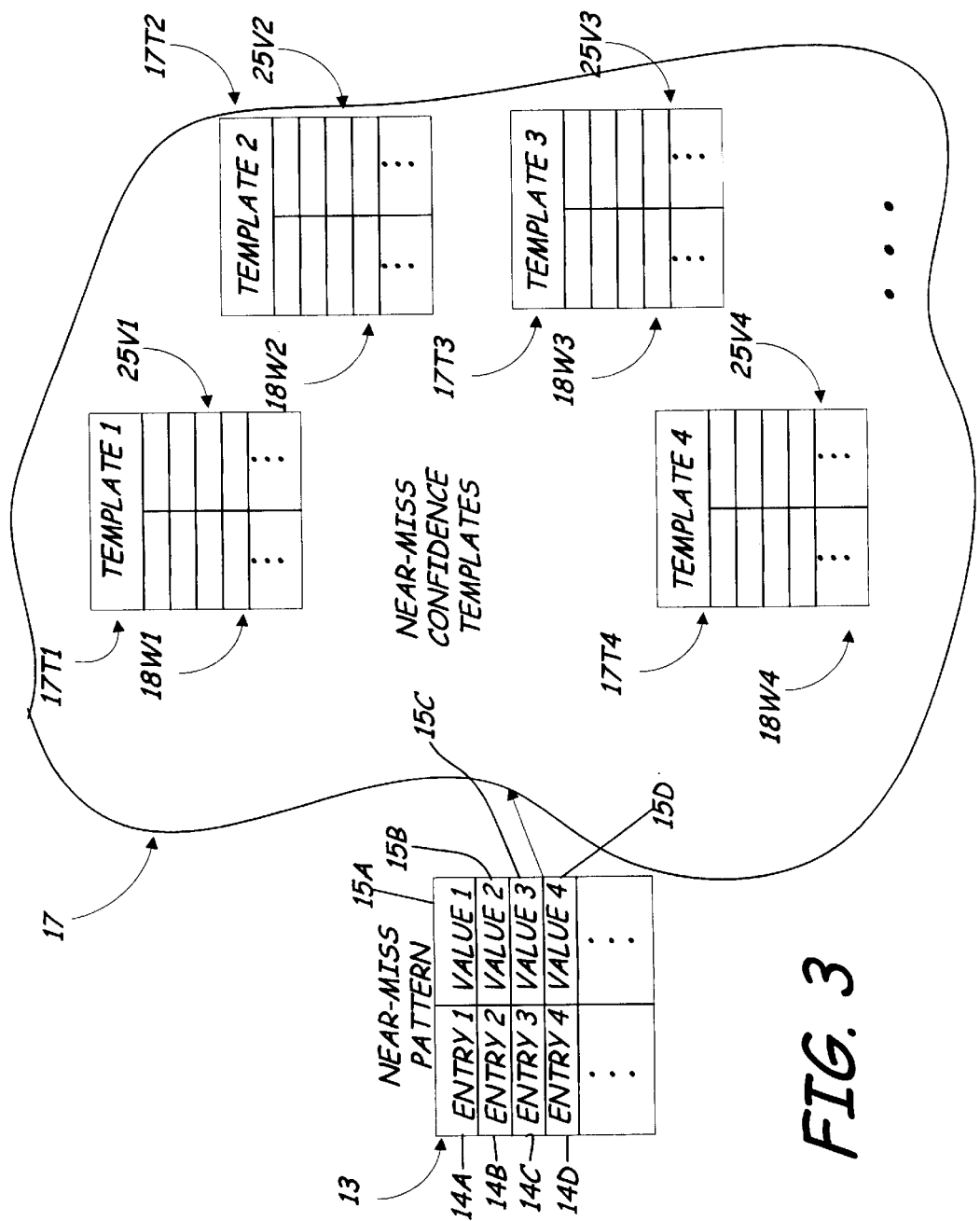
FIG. 3 is a pictorial illustrating operation of the method of FIG. 1.

Referring to FIGS. 1 and 3, one aspect of the present invention is a method 1 (FIG. 1) of confidence measure for speech recognition. The method 1 includes the steps of receiving an utterance of input speech as indicated at step 2. At step 4, Viterbi search is performed to obtain word tokens for the input wave form. At step 6, a word token of the input wave form and a hypothesis word are provided to a confidence measure system 7. Using any one of a number of known speech recognizers 5, the confidence measure system 7 creates a "near-miss" pattern or list 13 (FIG. 3) of possible word entries 14A, 14B, 14C and 14D at step 12. As used herein, "near-miss" shall mean a list (typically ordered) of most likely word candidates for the input word token. Each word entry 14A–14D includes an associated value of probability 15A, 15B, 15C and 15D that the input word token corresponds to the respective word entry 14A–14D. At step 16, the near-miss pattern 13 is compared with one of the near-miss confidence template 17T1, 17T2, 17T3 , 17T4, . . . corresponding to the hypothesis word in a collection 17. Each near-miss confidence template 17T1, 17T2, 17T3, 17T4, . . . in the collection 17 includes a list of word entries 18W1, 18W2, 18W3, 18W4, . . . , (similar to the near-miss pattern 13) for a control word (typically the word entry with the highest score). In particular, each list of word entries 18W1, 18W2, 18W3, 18W4, . . . , includes an associated value 25V1, 25V2, 25V3, 25V4, . . . . The word entries 18W1, 18W2, 18W3, 18W4, . . . , for each near-miss confidence 17T1, 17T2, 17T3, 17T4, . . . are each a "near miss" for the control word wherein the associated value provides an indication of acoustic similarity.

As stated above, the near-miss pattern 13 is compared with a corresponding near-miss confidence template (17T1, 17T2, 17T3, 17T4, . . . ) for the hypothesis word at step 16. In particular, a score (confidence measure) is calculated. The confidence measure is an indication as to whether to accept or reject the hypothesis word at step 30.

The hypothesis word varies depending on various applications. The applications can be classified as being operated in a supervised mode or in an unsupervised mode. Supervised mode includes applications like keyword spotting (where the system is spotting if some certain words are spoken by users), supervised adaptation and training (where the systems prompt users to speak selected words), and where the systems are expecting some certain word being uttered by the users. In the supervised mode, the hypothesis word and thus the near-miss confidence template (17T1, 17T2, 17T3, 17T4, . . . ) chosen is the known word for the word token, either the word prompted by the speech trainer, or the word to be spotted by keyword word spotting. Unsupervised mode includes usual speech recognition and unsupervised adaptation (where the recognized words without prompting are used directly to adapt the acoustic models), where the system has no preset expectation of what the users are going to say. Therefore, in the unsupervised mode, the hypothesis word, and thus the near-miss confidence template (17T1, 17T2, 17T3, 17T4, . . . ) chosen for the comparison, is the word entry 14A having the highest score in the near-miss pattern 13, i.e., the recognized word. Confidence measure in unsupervised mode is merely a double-check to make sure the recognized word is indeed the word uttered, otherwise, the system would just reject the hypothesis rather than output or adapt on a low-confidence word. Clearly when the cost of miss-recognition is substantial (e.g., if one miss-recognizes "delete the file" into "delete all files"), one would like to take advantage of a tight a confidence measure to reject the miss-recognition rather-proceed with a potential disaster.

Figure 4:
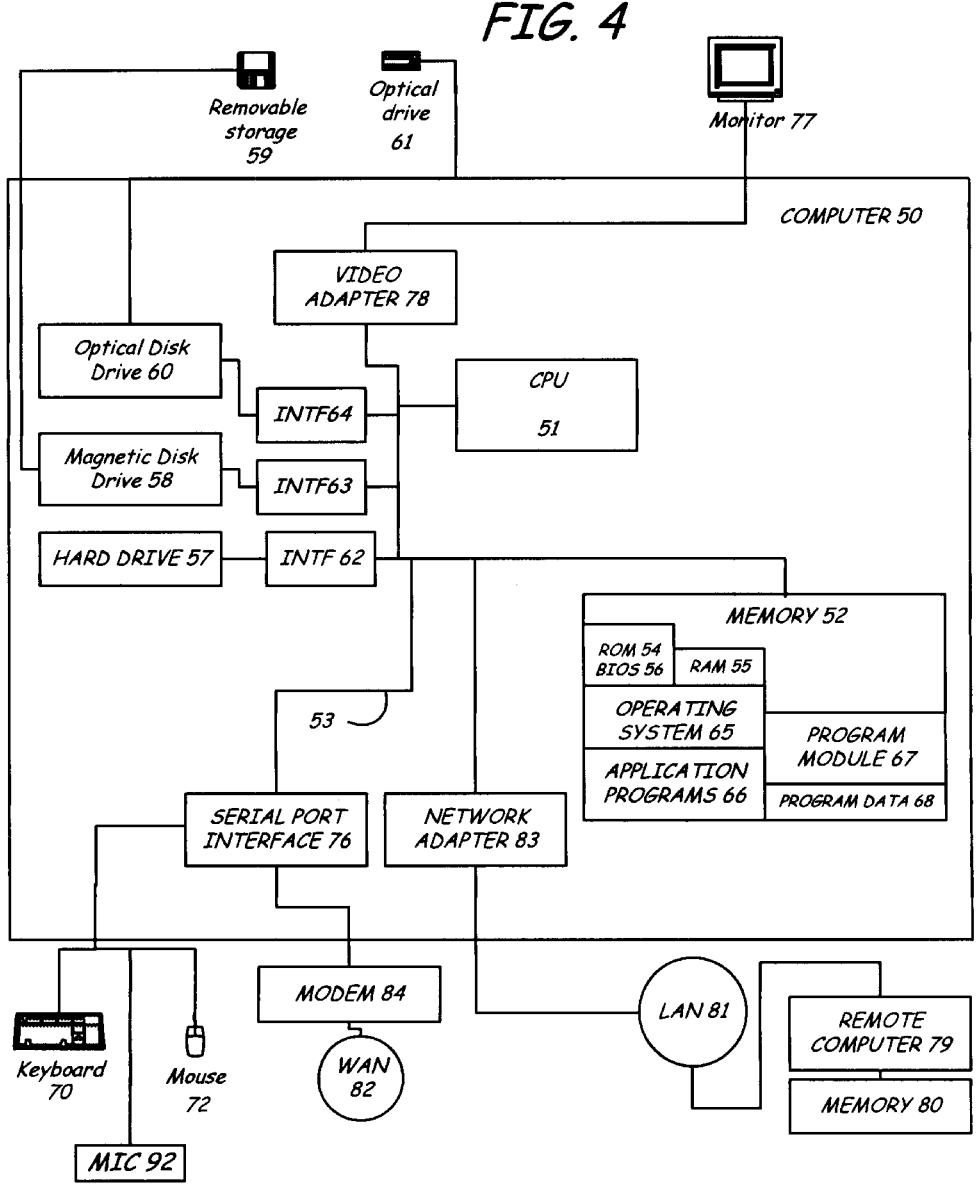
FIG. 4 is a block diagram of an exemplary environment for implementing the speech recognition system in accordance with the present invention.

Prior to a detailed discussion of the present invention, an overview of an exemplary operating environment may be helpful. FIG. 4 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including handheld devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing the invention includes a general purpose computing device in the form of a conventional personal computer 50, including a central processing unit 51, a system memory 52, and a system bus 53 that couples various system components including the system memory to the central processing unit 51. The system bus 53 may be any of several types of bus structures including a memory bus or a memory controller, a peripheral bus, and a local bus using any of a variety of bus architectures. The system memory includes read only memory (ROM) 54 and a random access memory (RAM) 55. A basic input/output (BIOS) 56, containing the basic routine that helps to transfer information between elements within the personal computer 50 such as during start-up, is stored in ROM 54. The personal computer 50 further includes a hard disk drive 57 for reading from and writing to a hard disk (not shown), a magnetic disk drive 58 for reading from or writing to removable magnetic disk 59, and an optical disk drive 60 for reading from or writing to a removable optical disk 61 such as a CD ROM or other optical media. The hard disk drive 57, magnetic disk drive 58, and optical disk drive 60 are connected to the system bus 53 by a hard disk drive interface 62, magnetic disk drive interface 63, and an optical drive interface 64, respectively. The drives and the associated computer-readable media provide nonvolatile storage of computer readable instructions, data structures, program modules and other data for the personal computer 50.

Although the exemplary environment described herein employs the hard disk, the removable magnetic disk 59 and the removable optical disk 61, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 59, optical disk 61, ROM 54 or RAM 55, including an operating system 65, one or more application programs 66, other program modules 67, and program data 68. A user may enter commands and information into the personal computer 50 through input devices such as a keyboard 70, pointing device 72 and microphone 92. Other input devices (not shown) may include a joystick, game pad, satellite dish, scanner, or the like. These and other input devices are often connected to the processing unit 51 through a serial port interface 76 that is coupled to the system bus 53, but may be connected by other interfaces, such as a sound card, a parallel port, a game port or a universal serial bus (USB). A monitor 77 or other type of display device is also connected to the system bus 53 via an interface, such as a video adapter 78. In addition to the monitor 77, personal computers may typically include other peripheral output devices such as a speaker and a printer (not shown).

The personal computer 50 may operate in a networked environment using logic connections to one or more remote computers, such as a remote computer 79. The remote computer 79 may be another personal computer, a server, a router, a network PC, a peer device or other network node, and typically includes many or all of the elements described above relative to the personal computer 50, although only a memory storage device 80 has been illustrated in FIG. 1. The logic connections depicted in FIG. 1 include a local area network (LAN) 81 and a wide area network (WAN) 82. Such networking environments are commonplace in offices, enterprise-wide computer network Intranets and the Internet.

When used in a LAN networking environment, the personal computer 50 is connected to the local area network 81 through a network interface or adapter 83. When used in a WAN networking environment, the personal computer 50 typically includes a modem 84 or other means for establishing communications over the wide area network 82, such as the Internet. The modem 84, which may be internal or external, is connected to the system bus 53 via the serial port interface 76. In a network environment, program modules depicted relative to the personal computer 50, or portions thereof, may be stored in the remote memory storage devices. It will be appreciated by those skilled in the art that the network connections shown are exemplary and other means of establishing a communications link between the computers may be used.

It should also be noted that the present invention is not limited to a digital computing environment such as described above. In particular, the present invention can be operated on analog devices or mixed signal (analog and digital) devices. Furthermore, the present invention can be implemented on a single integrated circuit, for example, in small vocabulary implementations.

Figure 5:
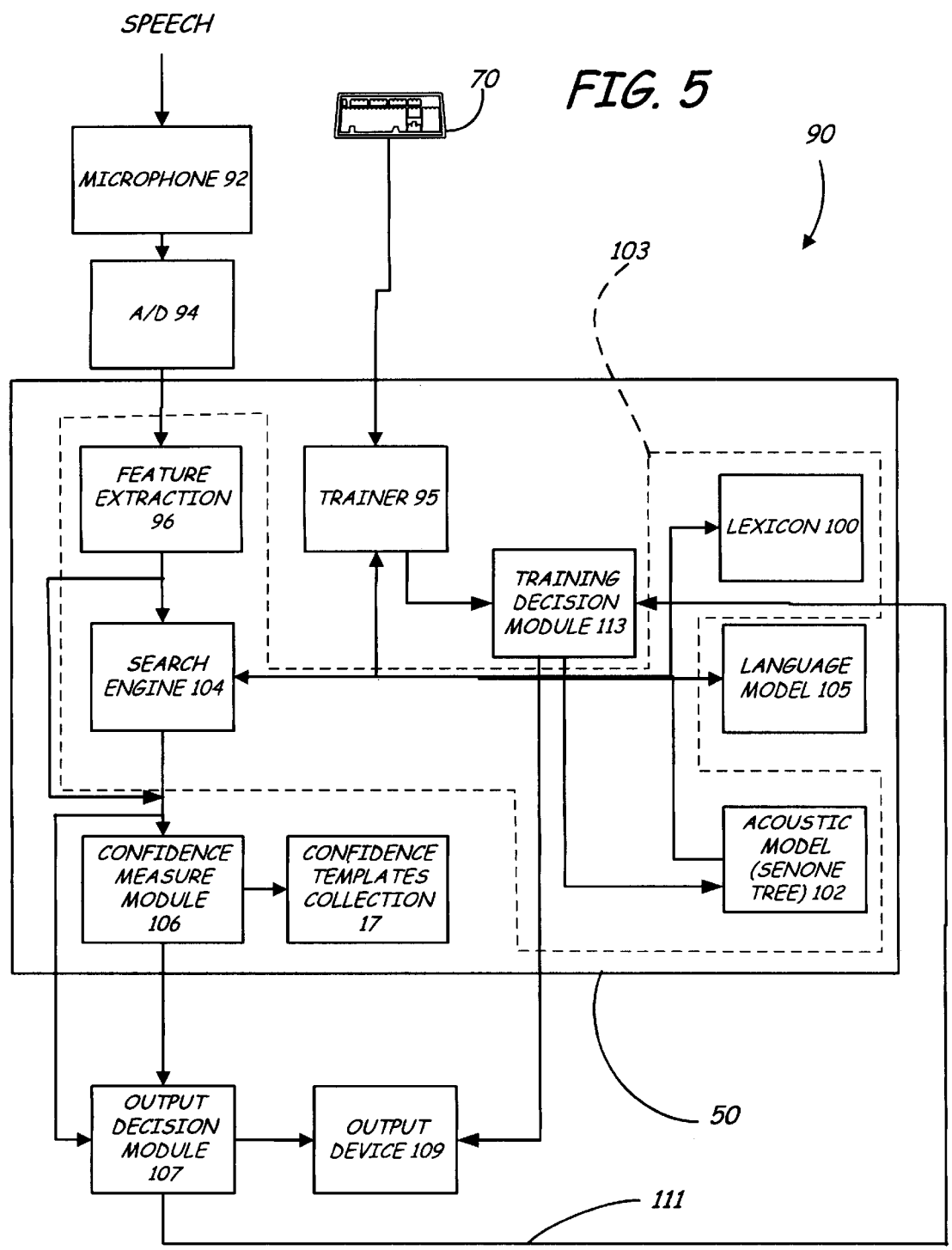
FIG. 5 is a more detailed block diagram of a speech recognition system having the confidence measure system of the present invention.

FIG. 5 illustrates a block diagram of a speech recognition system 90 in accordance with one aspect of the present invention. Speech recognition system 90 includes microphone 92, analog-to-digital (A/D) converter 94, training module 95, feature extraction module 96, lexicon storage module 100, acoustic model (e.g., senone tree) 102, tree search engine 104, and language model 105. Collectively, the feature extractor module 96, the lexicon storage module 100, the acoustic model 102, the search engine 104 and optionally the language model 105 are referred to herein as a near-miss pattern generator 103 for generating near-miss patterns such as the near-miss pattern 13 described above for each word token (FIG. 3).

It should be noted that the entire speech recognition system 90, or part of speech recognition system 90, can be implemented in the environment illustrated in FIG. 4. For example, microphone 92 may preferably be provided as an input device to personal computer 50, through an appropriate interface, and through A/D converter 94. Training module 95 and feature extraction module 96 may be either hardware modules in computer 50, or software modules stored in any of the information storage devices disclosed in FIG. 4 and accessible by CPU 51 or another suitable processor. In addition, lexicon storage module 100, acoustic model 102, and language model 105 are also preferably stored in any of the memory devices shown in FIG. 4. Further, tree search engine 104 is implemented in CPU 51 (which can include one or more processors) or can be performed by a dedicated speech recognition processor employed by personal computer 50. In addition, an output device 109 can, in one illustrative embodiment, be implemented as monitor 77, or as a printer, or any other suitable input/output device.

In the embodiment illustrated, during speech recognition, speech is provided as an input into the speech recognition system 90 in the form of an audible voice signal by the user to microphone 92. Microphone 92 converts the audible speech signal into an analog electronic signal which is provided to A/D converter 94. A/D converter 94 converts the analog speech signal into a sequence of digital signals which is provided to feature extraction module 96. In one embodiment, feature extraction module 96 is a conventional array processor which performs spectral analysis on the digital signals and computes a magnitude value for each frequency band of a frequency spectrum. The signals are, in one illustrative embodiment, provided to feature extraction module 96 by A/D converter 94 at a sample rate of approximately 16 kHz. A/D converter 94 may be a commercially available, well known A/D converter.

Feature extraction module 96 divides the digital signal received from A/D converter 94 into frames that include a plurality of digital samples. Each frame is approximately 10 milliseconds in duration. The frames are then encoded by feature extraction module 96 into a feature vector reflecting the spectral characteristics for a plurality of frequency bands in the case of discrete and semi-continuous hidden Markov modeling, feature extraction module 96 also encodes the feature vectors into one or more code words using vector quantization techniques and a code book derived from training data. Thus, feature extraction module 96 provides, at its output the feature vectors (or code words) for each spoken utterance. The feature extraction module 96 provides the feature vectors (or code words) at a rate of one feature vector or (code word) approximately every 10 milliseconds.

Output probability distributions are then computed against hidden Markov models using the feature vectors (or code words) of the particular frame being analyzed. These probability distributions are later used in executing a Viterbi or similar type of processing technique.

Upon receiving the code words from feature extraction model 96, tree search engine 104 accesses information stored in acoustic model 102. Model 102 stores acoustic models, such as Hidden Markov models, which represent speech units to be detected by speech recognition system 90. In one embodiment, acoustic model 102 includes a senone tree associated with each Markov state in a Hidden Markov model. The Hidden Markov models represent, in one illustrative embodiment, phonemes. Based upon the senones in acoustic model 102, tree search engine 104 determines the most likely phonemes represented by the feature vectors (or code words) received from feature extraction module 96, and hence representative of the utterance received from the user of the system.

Tree search engine 104 also accesses the lexicon stored in module 100. The information received by tree search engine 104, based on its accessing of the acoustic model 102, is used in searching lexicon storage module 100 to create the near-miss pattern 13 of entries 14A–14D with associated values 15A–15D. The values 15A–15D each represent the probability that the corresponding word entry 14A–14D represents the word token. Also, search engine 104 accesses the language model 105, which is illustratively a 60,000 word trigram language model derived from the North American Business News Corpus and set out in greater detail in a publication entitled CSR-III Text Language Model, University of Penn., 1994. The language model 105 is used in choosing the hypothesis word that most likely represents the input data and, thus, the word token provided by the speaker. The input waveform, hypothesis word and near-miss pattern are then provided by tree search engine 104 to confidence measure module 106. Confidence measure module 106 compares at least a part of the near-miss pattern 13 (i.e. the plurality of word entries 14A–14D and associated values 15A–15D) with word entries and values of the hypothesis word near-miss confidence template (either the keyword in keyword spotting or word with highest score in usual speech recognition) in the collection 17. The confidence measure module 106 provides as an output, a score indicative of the confidence that the hypothesis word is the correct word. The score is provided to an output decision module 107. The output decision module 107 also receives the near-miss pattern 13 or at least the hypothesis word. If the score from the confidence measure module 106 is sufficient, the hypothesis word is provided to the output device 109. If it is not, the hypothesis word is rejected. It should be noted that the system described above is essentially a speech recognition system or keyword spotting application. For supervised adaptation or training applications, the speech recognition system 90 can include a signal line 111 from the output decision module 107 to a training decision module 113. If the hypothesis word is rejected at the output decision module 107, the acoustic data can be discarded and the word can be re-prompted to the user at output device 109. If the hypothesis word is accepted, the acoustic data can be used to train or adapt the acoustic model 102.

Although described herein where the near-miss pattern generator 103 uses HMM modeling and senone trees, it should be understood that the near-miss pattern generator 103 can take many forms and all that is required is that the near-miss pattern generator 103 provide as an output the near-miss pattern 13, preferably with associated values 15A–15D indicating the probability that the associated word entries 14A–14D correspond to the spoken word (token).

Figure 6:
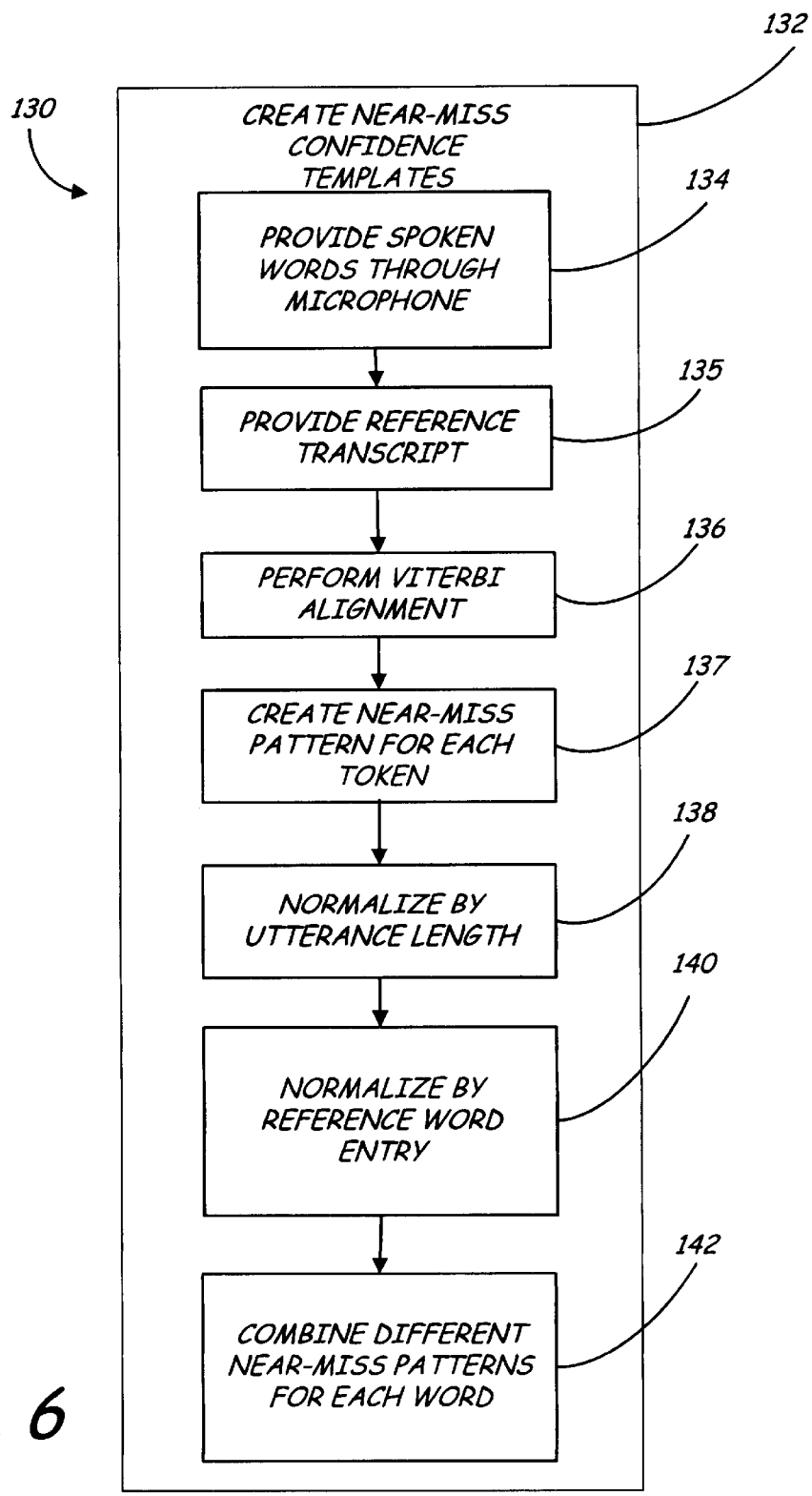
FIG. 6 is a flow chart illustrating a method for generating near-miss confidence templates in a collection.

FIG. 6 illustrates a method 130 for generating near-miss confidence templates 17T1, 17T2, 17T3, 17T4, . . . in the collection 17. At step 132, in the illustrated embodiment, microphone 92, A/D converter 94 and near-miss pattern generator 103 are used to create associated near-miss patterns for all words in the training database. Typically, step 132 includes providing a spoken training set that is spoken by the user into the microphone 92 at step 134. A reference transcript of the spoken training set is then provided as an input to computer 50, for example, through any of the input devices such as keyboard 70 or via a removable storage medium such as disk 59, as indicated at step 135. Viterbi alignment is then performed at step 136.

In one embodiment, the spoken training set includes multiple examples or tokens of the same word. For example, four occurrences (tokens) of the same speech item can be required to create a near-miss confidence template for the collection 17. Step 137 indicates that a near-miss pattern is created for each word token. For each word token of the same word, the values in each list for each word token are first normalized by utterance length at step 138 and then normalized by the value in the near-miss pattern for the reference transcript word at step 140. This procedure gives a per-frame acoustic probability normalized by the per-frame probability of the reference transcript word. Normalization in this manner is preferred since it guarantees the score for the reference word in each pattern to have a probability of 1.0.

In addition to the afore-mentioned normalization technique, normalization can also be a function of all values in the corresponding patterns summing to a selected value such as one. For instance, the entire pattern of values can sum up to one, or only chosen entries can sum up to one in each near-miss confidence template.

Figure 12:
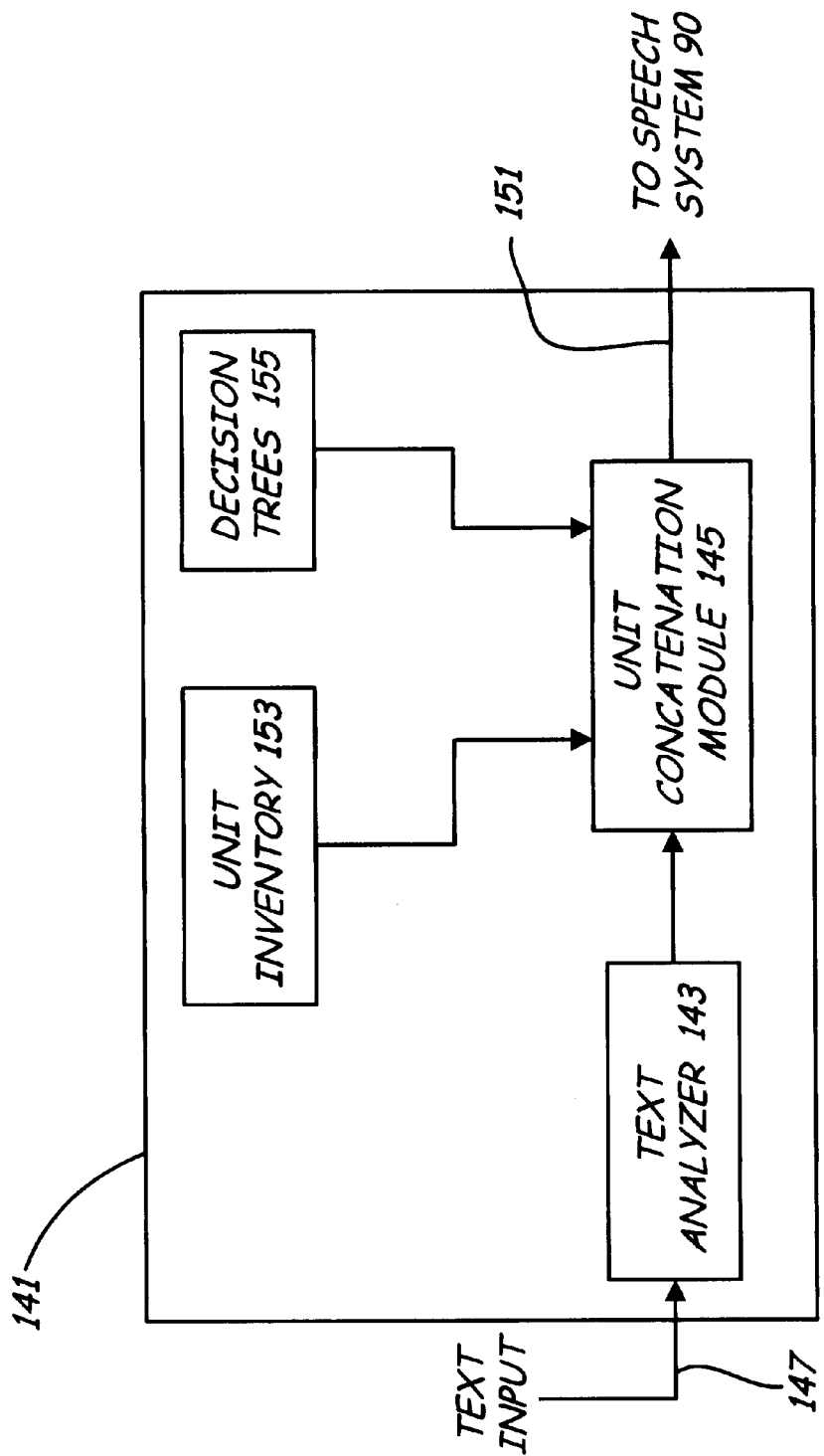
FIG. 12 is a block diagram for a system to create synthesized speech data.

At this point, another aspect of the present invention can be described. In particular, in addition to or in place of, the actual input speech provided by the user to the system 90 through microphone 92, synthesized speech data can also be used to form word tokens for use in step 142, described below. This method is very useful to provide training data for building confidence templates when there are not enough real training examples (e.g. fewer than 4) available for certain infrequent words. A system 141 for creating synthesized speech data is illustrated in FIG. 12. Generally, the system 141 includes a text analyzer 143 and a unit concatenation module 145. Text to be converted into synthetic speech is provided as an input 147 to the text analyzer 143. The text can be the words that the user has already provided to the speech recognition system 90 through the microphone 92, thereby creating additional examples or tokens already spoken by the user. Alternatively, the text can be new words that have not been spoken by the user, thereby increasing the extent of the collection 17. The text analyzer 143 performs text normalization, which can include expanding abbreviations to formal forms as well as expanding numbers, monetary amounts punctuation and other non-alphabetic characters into full word equivalents. The text analyzer 143 then converts the normalized text input to a string of sub-word elements, such as phonemes, by known techniques. The string of phonemes is then provided to the unit concatenation module 145. If desired, the text analyzer 143 can assign accentual parameters to the string of phonemes using prosodic templates, not shown.

The unit concatenation module 145 receives the phoneme string and constructs synthetic speech input, which is provided as an output signal 151 to the speech recognition system 90. Based on the string input from the text analyzer 143, the unit concatenation module 145 selects representative instances from a unit inventory 153 after working through corresponding decision trees stored at 155. The unit inventory 153 is a store of representative decision tree base context-dependent phoneme-based units of actual acoustic data. In one embodiment, triphones (a phoneme with its one immediately preceding and succeeding phonemes as the context) are used for the context-dependent phoneme-based units. Other forms of phoneme-based units include quinphones and diphones. The decision trees 155 are accessed to determine which phoneme-based unit is to be used by the unit concatenation module 145. In one embodiment, the phoneme-based unit is one phoneme so a total of 45 phoneme decision trees 155 are created and stored at 155. A phoneme decision tree is a binary tree that is grown by splitting a root node and each of a succession of nodes with a linguistic question associated with each node, each question asking about the category of the left (preceding) or right (following) phoneme. The linguistic questions about a phoneme's left or right context are usually generated by an expert in linguistics in a design to capture linguistic classes of contextual affects. In one embodiment, Hidden Markov Models are created for each unique context-dependent phoneme-based unit. A detailed description of creating the unit inventory 153 and the decision trees 155 is provided in co-pending application entitled "APPARATUS AND METHOD FOR CONVERTING TEXT-TO-SPEECH USING DECISION TREE CLUSTERED CONTEXT DEPENDENT PHONEME-BASED UNITS," Ser. No. 08/949,138, filed Oct. 2, 1997, which is hereby incorporated by reference.

As stated above, the unit concatenation module 145 selects the representative instance from the unit inventory 153 after working through the corresponding phoneme decision stored in the decision trees 155. During run time, the unit concatenation module 145 can either concatenate one of the best preselected phoneme-based instance or dynamically select the best phoneme-based instance available from a plurality of instances that minimizes a joint distortion function. In one embodiment, the joint distortion function is a combination of HMM score, phoneme-based unit concatenation distortion and prosody mismatch distortion. Use of multiple representatives in the unit inventory 153 for each phoneme is preferred because it creates multiple tokens of the same word. The system 141 can be embodied in any suitable computer such as described with respect to computer 50 wherein the text analyzer 143 and the unit concatenation module 145 can be hardware or software modules, and where the unit inventory 153 and the decision trees 155 can be stored using any of the storage devices described with respect to computer 50. The output signal 151 can be provided to the feature extraction module 96.

Referring back to FIG. 6, at step 142, the near-miss patterns for each token of the same word are then combined to create a single near-miss pattern with associated values. For instance, one simple model is a Gaussian classifier with a full or a diagonal covariance matrix. The values 25V1, 25V2, 25V3, 25V4, . . . in the near-miss confidence templates 17T1, 17T2, 17T3, 17T4, . . . for each control word would then consist of a mean vector and variance matrix. However, it should be understood that one might choose to build another classifier, such as a neural network for the near-miss confidence templates 17T1, 17T2, 17T3, 17T4, . . . . A neural network classifier may be preferred when more training examples for each word are available in the training set.

Figures 7, 9:
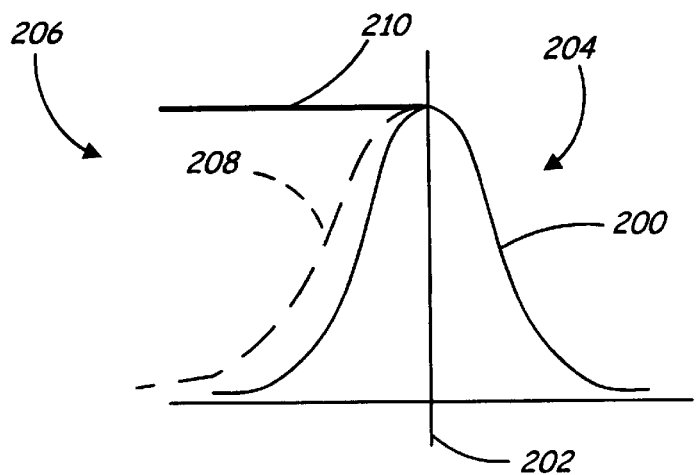
FIG. 7 is an example of a near-miss confidence template in the collection.
FIG. 9 is a pictorial representation of a symmetric and an asymmetric Gaussian function.

FIG. 7 is an example of a near-miss confidence template 150 for the word "writing". In this embodiment, the near-miss confidence template includes five specific word entries 152A, 152B, 152C, 152D and 152E, one of which being "writing" and two additional entries 152F and 152G, discussed below. In the illustrative embodiment, a diagonal Gaussian classifier was chosen so that associated values 154A, 154B, 154C, 154D, 154E, 154F and 154G comprise a matrix of mean vector and variance values. The selected number of word entries and associated values can be fixed for each near-miss confidence template 17T1, 17T2, 17T3, 17T4, . . . in the collection 17, or can vary from near-miss confidence template to near-miss confidence template in the collection 17. In the illustrative embodiment, the selected number of word entries 152A–152E can correspond to a fixed value of top entries, herein five entries, having the highest associated values 154A–154E. In another example, the selected number of word entries can be determined based on a function, such as a percentage, of the highest value 154A in the near-miss confidence template 150.

In the illustrative embodiment, the near-miss confidence template 150 includes the entry 152G denoted herein as "*". At this point, it should be noted that a near-miss pattern or near-miss confidence template is typically created from a long list of words and associated acoustic scores ordered highest to lowest. This list is known in the art as a "N-Best" list. Entry 152G is a compilation of values of a set of word entries which otherwise would be in the N-Best list. As stated above, in the illustrative embodiment, the near-miss confidence template 150 includes the five word entries 152A–152E having the highest associated values 154A–154E. Thus, some word entries in the N-Best list as outputted by the generator 103 are not specifically shown. In the illustrative embodiment, entry 152G represents all other entries that would otherwise be in the N-Best list wherein the value 154G comprises the compilation of the respective values.

Also in the illustrative embodiment, the near-miss confidence template 150 includes the entry "CI-PHN" and the corresponding value 154F. Entry 152F and its associated value 154F represent a prior art technique that can be used in combination with the other entries 152A–152E, and 152G to form part of the near-miss confidence template 150. Typically, value 154F is a confidence measure using prior art techniques. In the present embodiment, the value 154F is based on a context independent phone net score. Commonly, the context-independent phone net score is a ratio between a "filler model" (OOV) score and a recognition score. This type of confidence measure is commonly used in keyword spotting where the recognition score corresponds to the highest score received for a set of words to be detected, and the out-of-vocabulary score corresponds to the highest score for a set of filler words or models (which is often modeled by the context-independent phone network).

Figure 8B:
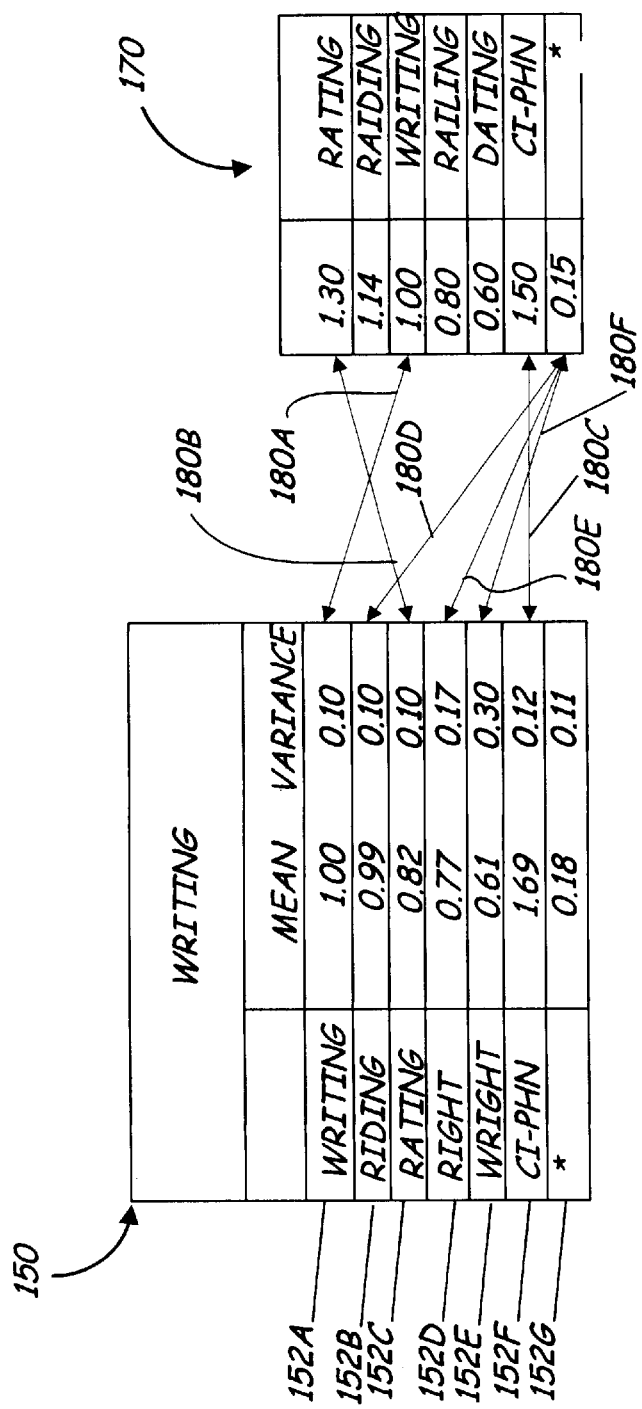

FIGS. 8A, 8B and 8C illustrate three techniques for comparing a near-miss pattern 170, provided as an output from the near-miss pattern generator 103 (FIG. 5) when a word token to be recognized is received, to the near-miss confidence templates 17T1, 17T2, 17T3, 17T4, . . . in the collection 17. In each of the techniques described below, the near-miss pattern 170 is compared with the near-miss confidence template 150 described above. The near-miss pattern 170 comprises entries 172A, 172B, 172C, 172D, 172E and 172F having associated values 174A, 174B, 174C, 174D, 174E and 174F.

In FIG. 8A, the near-miss pattern 170 controls the comparison between the near-miss confidence template 150 and the near-miss pattern 170. In FIG. 8A, comparison includes comparing the values of like entries in the near-miss pattern 170 and the near-miss confidence template 150, and comparing the values of other entries (those in the near-miss pattern list 170 but not found in the near-miss confidence template 150) with the value 154G associated with the compiled set of entries 152G in the near-miss confidence template 150. Double arrows 178A, 178B, 178C, 178D and 178E illustrate the values which are compared to each other.

In FIG. 8B, the near-miss confidence template 150 controls the comparison between near-miss confidence template 150 and near-miss pattern 170. In FIG. 8B, comparison includes comparing the values of like entries in the near-miss confidence template 150 and the near-miss pattern 170, and comparing the values of other entries (those in the near-miss confidence template 150 but not found in the near-miss pattern 170) with the value 174G associated with the compiled set of entries 172G in the near-miss pattern 170. Double arrows 180A, 180B, 180C, 180D and 180E illustrate the values which are compared to each other.

In FIG. 8C, the near-miss pattern 170 controls the comparison between near-miss confidence template 150 and near-miss pattern 170. In this comparison technique, comparison includes comparing like entries in the near-miss pattern 170 and the near-miss confidence template 150. Then, only those other entries (those in the near-miss pattern 170 but not found in the near-miss confidence template 150), having a probability value greater than the last single common word entry (in the illustrative embodiment, "writing") are compared to the value 154G of entry 152G. Double arrows 186A, 186B, 186C and 186D illustrate the entries that are compared.

In the illustrated embodiment, where a Gaussian classifier has been used, a confidence score C can be calculated during the step of comparing as given by the following equation (assuming a diagonal covariance matrix):

$$C = \exp\left[-\frac{1}{2}\sum_{i=1}^{L}\frac{(s(w'_i)-\mu_v(w'_i))^2}{\sigma_v^2(w'_i)}\right] \quad (\text{EQ 1.})$$

where $\mu_v(w'_i)$ and $\sigma^2_v(w'_i)$ are the selected mean and variance values 154A–154G, respectively, of the near-miss confidence template 150, $(w'_i)$ are the selected values 172A–172G of the entries in the near-miss pattern 170, and L represents the number selected. Depending on which comparison technique above is used, the value of "*" for elements not specifically shown in either the near-miss pattern 170 or in the near-miss confidence template 150 is used. It should be noted that although illustrated wherein both the near-miss confidence template 150 and near-miss pattern 170 each have seven entries, it is not necessary that the patterns/lists have an equal number of entries. It should also be noted that when the near-miss pattern 170 is being compared to the near-miss confidence template 150, the values 174A–174G in the near-miss pattern 170 are normalized based on the value of the entry corresponding to the near-miss confidence template 150. For instance, in FIGS. 8A–8C, the near-miss pattern 170 is normalized based on the value 174C for "writing" since the near-miss confidence template 150 is for "writing". If, on the other hand, the near-miss pattern 170 is being compared to a near-miss confidence template corresponding to "raiding", the near-miss pattern 170 would be normalized based on the value 174B for "raiding".

Calculation of the confidence score C using the above-described equation in effect assigns penalties equally whether a difference between the value in the near-miss pattern 170 for a particular entry is greater or less than the corresponding mean value in the near-miss confidence template 150. FIG. 9 is a pictorial illustration of a Gaussian function 200 having a mean 202. Region 204 corresponds to values in the near-miss pattern 170 that are greater than the associated mean value, while region 206 corresponds to values in the near-miss pattern 170 that are less than the associated mean value. Since the Gaussian function 200 is symmetric about the mean 202, equal penalties are in effect assigned independent of whether or not the associated value is greater or less than the mean 202.

In a further embodiment, the Gaussian function 200 can be modified such that for values in the near-miss pattern 170 that are less than the associated mean value in the near-miss confidence template 150, less of a penalty is in effect applied. This is represented in FIG. 9 as 208. In effect, this realizes an "asymmetric" function wherein the function is no longer symmetric about the mean 202. Use of an asymmetric function can be helpful in the case of speech recognition system since the values in the near-miss pattern 170 represent the probability that the utterance corresponds to a particular word. When compared to a stored near-miss confidence template, it may be desirable to assign a greater penalty for entries having a value greater than the associated mean value stored in the near-miss confidence template, than those entries having a value less than the associated mean value in the stored near-miss confidence template. In yet a further embodiment, it may be desirable not to assign any penalty if the value in the near-miss pattern 170 is less than the mean value for the associated entry in the near-miss confidence template 150. This is represented in FIG. 9 as line 210. The asymmetric functions are clearly favoring the "low-probability" entries in the near-miss list since those entries are miss-recognition entries anyway.

In one embodiment, the hypothesis word, is rejected or accepted based on the calculated confidence score C. In other words, if the confidence score C is greater than a selected threshold, the hypothesis word is accepted, while if the confidence score C is less than the selected threshold, the hypothesis word is rejected.

Figure 10:
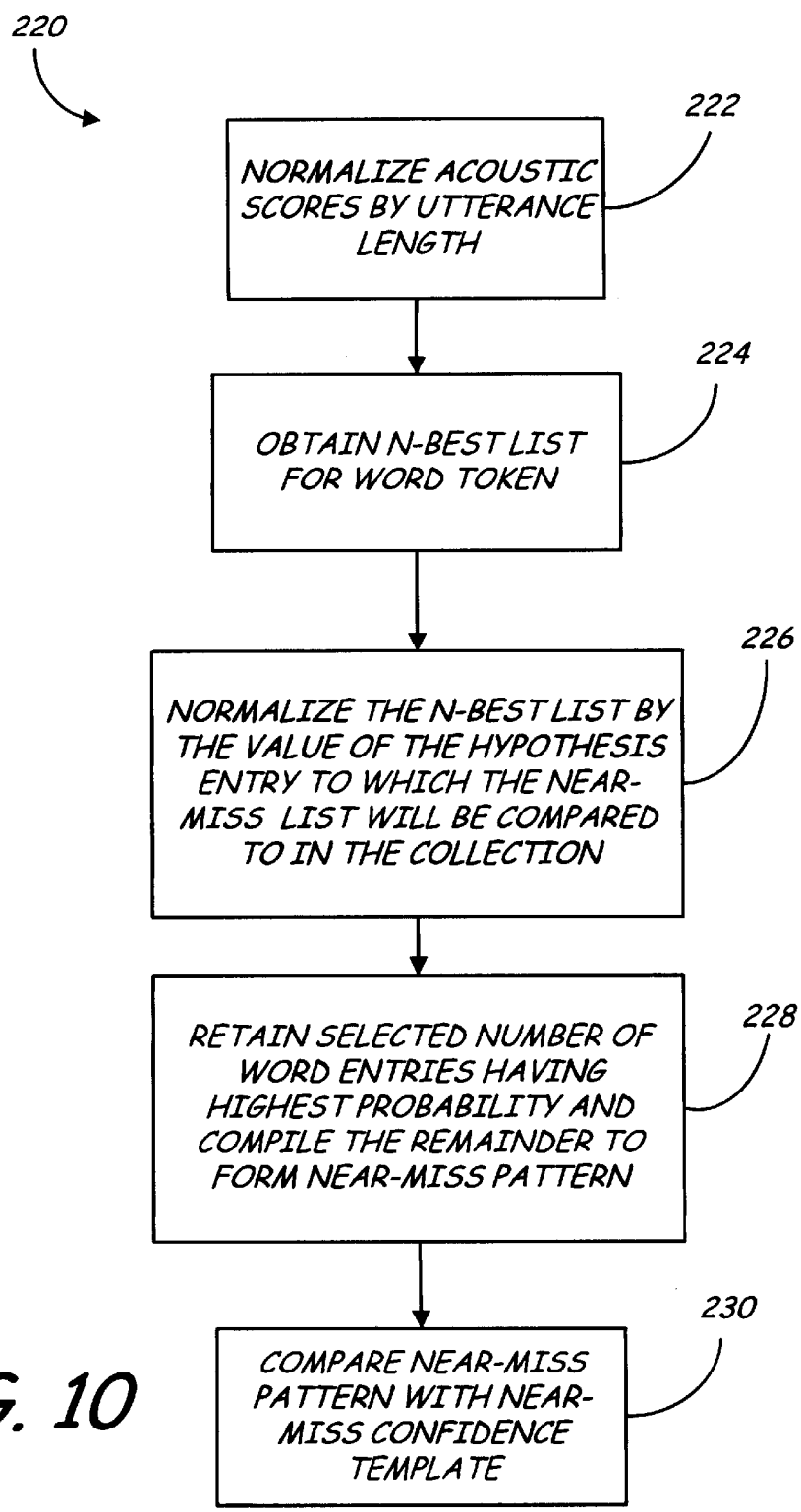
FIG. 10 is a flow chart illustrating a method of processing an utterance.

A procedure for analyzing an utterance is illustrated in FIG. 10 at 220. The acoustic values for the utterance are first normalized based on length of the utterance as indicated at step 222 (similar to step 138 discussed above). The near-miss pattern from near-miss pattern generator 103 includes first obtaining the N-Best list at step 224. The N-Best list can have any selected number of entries, for example, 10, 50 or 100 entries. The values in the N-Best list are then normalized based on the value for a particular entry to which the list will be subsequently compared to in the collection 17, as indicated at step 226. In the embodiment illustrated in FIGS. 8A–8C, a selected number of the normalized values and associated entries (herein, five) are retained to form the near-miss pattern 170, while all others are compiled into the value 174G at step 128. The confidence score C is then calculated at step 230 using the equation above according to any of the comparison techniques described above and illustrated in FIGS. 8A–8C.

At this point, it may be helpful to further describe different operating environments in which the present invention can be used. In supervised mode (keyword spotting, supervised adaptation or training), the speaker is supposed to speak a selected word. The word token is then analyzed and compared using the method described above to ascertain if the word token corresponds to the hypothesis word by comparing it to the associated near-miss confidence template previously stored in the collection 17. When the calculated confidence score C is compared to the preset threshold, the hypothesis word is accepted or rejected based on whether it is greater than or less than the preset threshold.

In the supervised mode of operation, it may be desirable to ensure that acoustically similar words are not falsely accepted. For instance, when a user speaks "raiding", it is desirable that this word token not be misinterpreted as "writing". Another aspect of the present invention includes obtaining negative examples for training a speech recognition system by using the acoustically similar words to a given word. The acoustically similar words are provided in the near-miss pattern 170 generated by the near-miss pattern generator 103 since they have a relatively high probability value. In the supervised mode, one would also want to use words that look similar to the given word, for example, using "writing" as the given word, one would also prompt the user to speak words that took similar to "writing," for instance, "waiting" in the event the user misperceives this word as "writing". The use of negative examples will enable the user to adjust the preset confidence threshold so as not to allow too many false-accept.

Likewise, in the unsupervised mode of operation, where the speech recognition system 90 is being used to recognize utterances, it is also desirable to use negative examples during fine-tuning the preset confidence threshold. In other words, words that are acoustically similar to the word to be recognized should be used in training. Again, the near-miss pattern 170 can provide these words since the acoustically similar words have high probability values.

As discussed above, a preset threshold is chosen and the calculated confidence score (C) is compared to the threshold to determine if the hypothesis word corresponds to the word token. In one mode of operation, the selected threshold can be a fixed threshold used for every word to be recognized, or can be chosen based on the word to be recognized. Thus, a different threshold can be used for each word to be recognized.

In another mode of operation, the use of two thresholds may be desirable. A two level threshold includes the first preset threshold described above, and a second threshold. If a calculated confidence score does not exceed the first threshold, the hypothesis word is rejected for a given word token, as stated above. If the confidence score exceeds the first threshold, the confidence score is then compared to the second threshold.

Referring to FIG. 11, assume an utterance is obtained and the near-miss pattern generator 103 provides a near-miss pattern 250 wherein "raiding" 254A received a probability value 254A that is greater than a value 254B for "writing" 252B. Upon calculation of the confidence score with respect to the near-miss confidence template associated with "writing", the calculated confidence score may exceed the first threshold. However, to ensure that the word token best corresponds to "writing", the near-miss pattern 250 is re-normalized with the score of "raiding" and compared to the confidence template for "raiding" since "raiding" 252A received the highest probability value 254A. (It should be noted that in FIG. 11, near-miss pattern 250 was original normalized with the score of "writing" and compared to the confidence template "writing".) Having obtained the confidence score for comparison of the near-miss pattern 250 to both "writing" and to "raiding", the respective confidence scores are compared to each other by using the second threshold. In one embodiment, a ratio is formed from the confidence scores of the expected word "writing" and the word that received the highest probability value "raiding", which can be generally represented as:

$$\frac{C(\text{expected word})}{C(\text{recognized word})}$$

wherein, in a supervised mode of operation, the "expected word" corresponds to the word the user is prompted to speak and the "recognized word" is the word receiving the highest probability value. If the ratio of the confidence scores exceeds the second selected threshold, the expected word is accepted. In an unsupervised mode, ratios can be calculated and compared to each other based on a selected number of entries in the near-miss pattern 250, for example, among the top three, or based on those entries having values greater than a given percentage of the highest received value. Besides the use of ratios herein described, it should be understood that other mathematical comparisons, such as taking a difference between calculated confidence scores, can also be used. The second selected threshold can be a fixed threshold used for all words or can be adjusted on a word by word basis.

Finally, a two-level threshold can also be used in an unsupervised adaptation mode. In this mode, a first (lower) confidence measure threshold can be used for speech recognition wherein if, for each word token, the hypothesis word exceeds the first confidence measure threshold, it is displayed or otherwise a rejection signal is displayed to the user. However, in order not to contaminate the acoustic models, a second threshold (higher than the first one) is employed, so only the data with high confidence measure (higher than the second threshold) will be used to adapt the correspondent acoustic models.

Although the present invention has been described with reference to preferred embodiments, workers skilled in the art will recognize that changes may be made in form and detail without departing from the spirit and scope of the invention.

What is claimed is:

1. A method of performing speech recognition, the method comprising:

receiving an utterance of input speech;

creating a near miss list of possible word entries for the utterance, each word entry including an associated value of probability that the utterance corresponds to the word entry;

comparing the near-miss list with a stored near-miss confidence template in a collection, wherein each near-miss confidence template in the collection comprises a list of word entries and each word entry in each list includes an associated value; and performing confidence measure in a speech recognition system based on the comparison of the values in the near-miss list of possible word entries with the values of at least one of the near-miss confidence templates in the collection.

2. The method of claim 1 wherein the near-miss list of possible word entries comprises a selected number of word entries.

3. The method of claim 2 wherein each near-miss confidence template in the collection comprises a selected number of word entries, and wherein the near-miss list of possible word entries and each near-miss confidence template in the collection includes a value comprising a compilation of values of a set of word entries.

4. The method of claim 3 wherein the set of word entries corresponds to word entries not forming part of the selected number of word entries.

5. The method of claim 4 wherein the step of comparing includes comparing values of like word entries in the near-miss list of possible word entries and the near-miss confidence template, and comparing the values of other word entries in the near-miss list of possible word entries with the value associated with the set of word entries in the near-miss confidence template.

6. The method of claim 4 wherein the step of comparing includes comparing values of like word entries in the near-miss list of possible word entries and the near-miss confidence template, and comparing the values of other word entries in the near-miss confidence template with the value associated with the set of word entries in the near-miss list of possible word entries.

7. The method of claim 4 wherein the word entries corresponding to single word entries in the near-miss list of possible word entries and each of the near-miss confidence templates are ordered as a function of numeric value, and the step of comparing includes comparing values of like word entries in the near-miss list of possible word entries and the near-miss confidence template, and comparing the values of other words entries in the near-miss confidence template, having a numeric value greater than the lowest like word entry, with the value associated with the set of word entries in the near-miss list of possible word entries.

8. The method of claim 1 wherein the near-miss list of possible word entries comprises a number of word entries based on a function of at least one of the values in the near-miss list.

9. The method of claim 8 wherein the function is a percentage of the value indicating highest probability.

10. The method of claim 1 and further comprising normalizing the utterance of input speech by the utterance length.

11. The method of claim 10 and further comprising normalizing the near-miss list of possible word entries.

12. The method of claim 11 wherein the step of normalizing the near-miss list of possible word entries includes normalizing the values of a selected number of the near-miss list of word entries to sum to a selected total value.

13. The method of claim 12 wherein the step of normalizing the near-miss list of possible word entries includes normalizing the values of a complete N-Best list of word entries to sum to the selected total value.

14. The method of claim 11 wherein the step of normalizing the near-miss list of possible word entries includes normalizing the values of the near-miss list as a function of the value of the word entry with the highest probability.

15. The method of claim 11 wherein the step of normalizing the near-miss list of possible word entries includes normalizing the values of the near-miss list as a function of one of the values in the near-miss list.

16. The method of claim 15 wherein the step of receiving an utterance includes receiving an utterance of a known word item, and wherein the near-miss list of possible word entries includes an entry and value for the known word item, and wherein step of normalizing includes normalizing the values of the near-miss list of possible word entries as a function of the value for the known word item.

17. The method of claim 1 wherein the step of comparing includes calculating a confidence measure value, and wherein the step of performing includes comparing the confidence measure value to a threshold.

18. The method of claim 17 wherein the step of comparing includes calculating a first confidence measure value when the near-miss list of possible speech entries is compared with a first nearmiss confidence template, and calculating a second confidence measure value when the near-miss list of possible word entries is compared with a second near-miss confidence template, and wherein the step of performing includes comparing a function of the first confidence measure value and the second confidence measure value with a second threshold.

19. The method of claim 17 wherein the step of comparing includes using a gaussian calculation.

20. A method for generating near-miss confidence templates for a collection in a speech recognition system, the method comprising the steps of:

obtaining a set of near-miss confidence templates for input word tokens of the same word for each of a plurality of different words, wherein each near-miss confidence template of each set of near-miss confidence templates comprises a list of word entries having an associated value related to acoustic similarity; and combining the set of nearmiss confidence templates as a function of the lists of word entries and associated values to generate a single near miss confidence template for each of the plurality of different words.

21. The method of claim 20 wherein at least some of the input word tokens correspond to user utterances.

22. The method of claim 21 wherein the step of obtaining includes normalizing acoustic data related to each utterance by the utterance length.

23. The method of claim 21 wherein the step of obtaining includes receiving user utterances through a microphone.

24. The method of claim 20 wherein at least some of the input word tokens correspond to synthetic speech.

25. The method of claim 24 wherein the step of obtaining includes generating an input word token from stored acoustic data.

26. The method of claim 25 wherein the step of obtaining includes concatenating stored representative acoustic data to form the input word token.

27. The method of claim 26 wherein the step of obtaining includes receiving a textual representation of the input word token.

28. The method of claim 26 wherein the step of concatenating includes referencing a set of decision trees to select representative acoustic data to concatenate.

29. The method of claim 20 wherein the step of combining includes combining based on a gaussian classifier.

30. The method of claim 20 wherein the step of obtaining includes normalizing each word item.

* * * * *